No. 756,401. PATENTED APR. 5, 1904.
C. M. PERKINS.
NON-CONDUCTING HANDLE.
APPLICATION FILED NOV. 17, 1902.
NO MODEL.

Attest:
Edw. L. Dillon
J. B. Megown

Inventor:
Clarence M. Perkins,
by Carr & Carr,
Attys.

No. 756,401.

Patented April 5, 1904.

UNITED STATES PATENT OFFICE.

CLARENCE M. PERKINS, OF ST. LOUIS, MISSOURI.

NON-CONDUCTING HANDLE.

SPECIFICATION forming part of Letters Patent No. 756,401, dated April 5, 1904.

Application filed November 17, 1902. Serial No. 131,691. (No model.)

*To all whom it may concern:*

Be it known that I, CLARENCE M. PERKINS, a citizen of the United States, and a resident of the city of St. Louis and State of Missouri, have invented a new and useful Improvement in Non-Conducting Handles, of which the following is a specification.

It has heretofore been customary to insulate the handles of silver teapots and similar vessels by inserting horn or ivory or other similar material between the handle proper and the parts to which it is attached. Usually the horn is a cylindrical piece with its diameter reduced at each end, one end being inserted into the hollow base provided therefor on the body of the vessel and the other end being inserted into the hollow handle, so that the central shoulder intervenes between the metallic parts. Under this arrangement the pieces of horn must be of considerable size and strength and the fastening is liable to work loose and allow the handle to wabble.

It is the principal object of my invention to economize horn, to provide against the working loose of the handle, and to provide for the tightening of the handle in case it should become loose.

To these ends my invention consists in mounting an insulated bolt in the base portion of the handle in position to work into a nut provided therefor in the handle proper and in equipping the bolt with an insulating-button having a polygonal hole arranged to fit over a polygonal section of the bolt, so as to constitute a means for turning the bolt.

My invention also consists in the combination and arrangement of parts hereinafter described and claimed.

Figure 1:
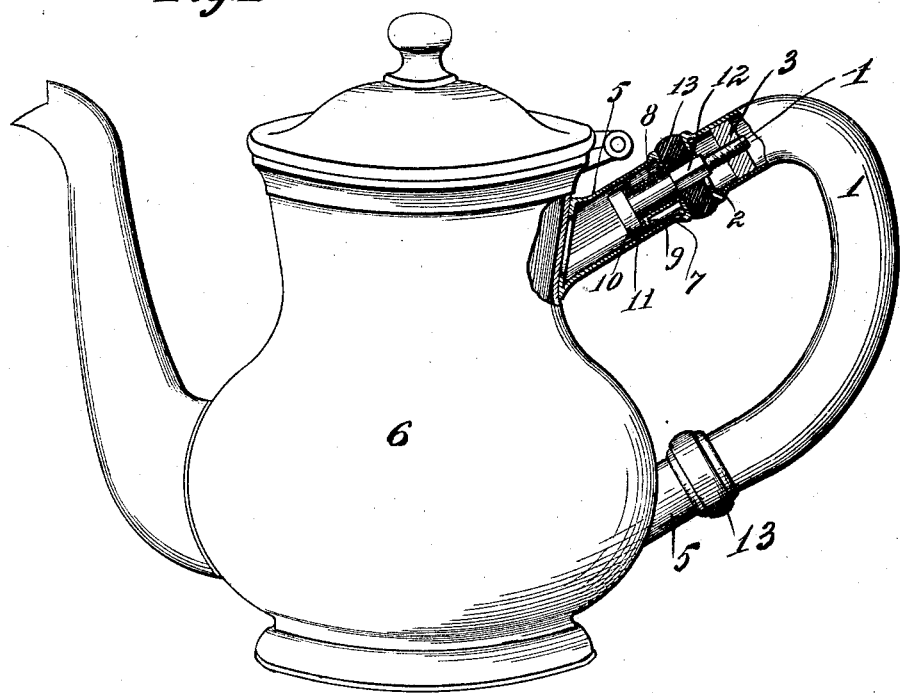
Figure 2:
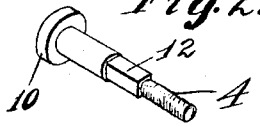
Figure 3:
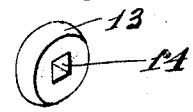
Figure 4:
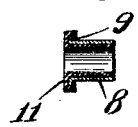

In the accompanying drawings, which form part of this specification, and wherein like symbols refer to like parts wherever they occur, Figure 1 is a side view of a teapot with the parts constituting the means for mounting the handle shown in section. Fig. 2 is a detail view of the bolt. Fig. 3 is a detail view of the insulating-button. Fig. 4 is a sectional detail of the stiffening-thimble and the insulating-sleeve therein.

The handle proper, 1, of my device is hollow or tubular, and preferably the ends thereof are turned inwardly to constitute stiffening-flanges 2. Inside of the handle near each end is mounted a threaded nut 3, adapted to receive the threaded end of a bolt 4, which is mounted in the base member 5 and projects therefrom. The base member 5 is likewise tubular and has one end adapted to be soldered onto the body 6 of the pot, while its other end has an annular flange 7 for the purpose of stiffening it. Inside of the base member is a thimble or sleeve 8, which at one end is secured to the annular flange and has its free end 9 flanged to increase its rigidity and afford a large bearing-surface for the bolt-head 10. This bearing-surface forms a shoulder for engaging the bolt-head 10. The bolt extends through the thimble or sleeve 8 and is surrounded by a sleeve or coating 11, of insulating material, which intervenes between the thimble and the body and head of said bolt. The intermediate portion of the bolt has a rectangular or polygonal section 12, slightly larger in diameter than that of the threaded end portion of the bolt. A button of insulating material 13, such as horn or vegetable ivory, has a central hole 14 of a shape and size to fit over the polygonal portion of the bolt and is of slightly larger diameter than that of the end of the handle proper.

The construction hereinbefore described is mounted and used as follows: The bolt is inserted through the open bottom of the base member of the handle and through the sleeve or thimble therein before the base member is soldered to the pot. The button is fitted over the polygonal portion of the bolt, and then the handle proper is brought into position for the threaded end of the bolt to enter the nut. The button is then turned by hand, causing the bolt to screw into the nut and draw the parts tightly together. In this position the button separates the principal metallic parts, and the sleeve or coating of insulating material around the bolt completely insulates said bolt. On account of the long bearing furnished by the thimble the handle is held rigidly and its liability to loosen is reduced, and in case the handle should become loose it is easily tightened by merely turning the button.

Obviously the button may be made of any insulating material of sufficient strength to tighten the bolt. So, too, the bolt may be insulated in any suitable way, as by dipping the bolt into a liquid adapted to harden and constitute a heat-non-conducting coating.

What I claim is—

1. A non-conducting handle comprising a handle proper and a base portion, said base portion comprising a flange and an inwardly-extending thimble, bolts for connecting the handle and base portions, heat-insulating material intervening between the bolt and the thimble and a button on said bolt between the handle proper and the base portion.

2. A heat-insulating handle consisting of a handle proper having a nut fixed therein, a hollow base and a bolt swiveled in said hollow base and arranged to coöperate with said nut, and a button of insulating material between said handle proper and said base, said button fitting over a polygonal section of said bolt whereby it is adapted to turn the same, substantially as described.

3. A non-conducting handle consisting of a handle proper having a nut fixed therein, a hollow base consisting of a metal shell flanged at one end and adapted to be mounted at its other end upon the body of the vessel, a thimble inside of said shell and fixed to its end flange, and a bolt extending through said thimble and having a threaded nut working on its end, a sleeve of insulating material intervening between said thimble and the head and body of the bolt, and a button of insulating material mounted on said bolt and lying between the base and the end of the handle proper, substantially as described.

4. The combination with a pot or vessel, of a heat-insulating handle consisting of a handle proper having nuts fixed therein, hollow base portions mounted upon the body of said vessel and having their outer ends flanged, insulated bolts swiveled in said bases and arranged to coöperate with said nuts, and a button of insulating material between each end of the handle proper and the adjacent base portion, each of said buttons having a hole fitting over a polygonal section of the corresponding bolt whereby it is adapted to turn the same, substantially as described.

5. A non-conducting handle comprising a handle proper, a base portion provided with an inner shoulder, a bolt having one end engaging the shoulder and the other connected to the handle proper, heat-insulating means between the bolt and the base portion, and a flat button of heat-insulating material lying between the base portion and the end of the handle proper.

6. A non-conducting handle comprising a handle proper and a hollow base portion, said base portion being provided with an inner shoulder, a headed bolt having its head engaged with the shoulder and its opposite end secured to the handle, and a button of heat-insulating material mounted upon the bolt between the handle proper and the base portion and adapted to manipulate the bolt.

7. A non-conducting handle comprising a handle proper, a base portion provided with an internal bore and an inner shoulder, a bolt having one end engaged with the shoulder and the other end connected to the end of the handle proper, a button of heat-insulating material surrounding the bolt and lying between the end of the handle and base portion, and heat-insulating material between the bolt and the shoulder and the inner wall of the bore.

CLARENCE M. PERKINS.

Witnesses:
 EUGENE BUDER,
 WILLIAM P. CARR.